United States Patent
Ryoshi et al.

(10) Patent No.: US 8,535,573 B2
(45) Date of Patent: Sep. 17, 2013

(54) COPPER FINE PARTICLES, METHOD FOR PRODUCING THE SAME, AND COPPER FINE PARTICLE DISPERSION

(75) Inventors: Kazuomi Ryoshi, Niihama (JP); Yasumasa Hattori, Niihama (JP); Hiroko Oshita, Niihama (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 315 days.

(21) Appl. No.: 12/734,489

(22) PCT Filed: Oct. 31, 2008

(86) PCT No.: PCT/JP2008/069917
§ 371 (c)(1),
(2), (4) Date: May 5, 2010

(87) PCT Pub. No.: WO2009/060803
PCT Pub. Date: May 14, 2009

(65) Prior Publication Data
US 2010/0230644 A1    Sep. 16, 2010

(30) Foreign Application Priority Data
Nov. 5, 2007 (JP) .................................. 2007-287152

(51) Int. Cl.
*H01B 1/02* (2006.01)
*H01B 1/22* (2006.01)

(52) U.S. Cl.
USPC ................. 252/512; 75/338; 75/393; 75/351; 75/373

(58) Field of Classification Search
USPC ..................... 252/512; 75/338, 343, 351, 373
See application file for complete search history.

(56) References Cited

U.S. PATENT DOCUMENTS

| | | | |
|---|---|---|---|
| 4,539,041 A | 9/1985 | Figlarz | |
| 5,094,686 A * | 3/1992 | Kawakami et al. | 75/343 |
| 8,083,972 B2 * | 12/2011 | Mori et al. | 252/512 |

FOREIGN PATENT DOCUMENTS

| | | | |
|---|---|---|---|
| JP | 02-011702 | * | 1/1990 |
| JP | 2000077070 | | 3/2000 |
| JP | 2000123634 | | 4/2000 |
| JP | 2002029755 | | 1/2002 |
| JP | 2003166006 | | 6/2003 |
| JP | 2005097677 | | 4/2005 |
| JP | 2005-307335 | * | 11/2005 |
| JP | 2005307335 | | 11/2005 |
| JP | 2005330552 | | 12/2005 |

OTHER PUBLICATIONS

English Abstract of JP2003166006.

(Continued)

*Primary Examiner* — Khanh Tuan Nguyen
(74) *Attorney, Agent, or Firm* — Dykema Gossett PLLC

(57) ABSTRACT

A method for producing copper fine particles by heating and reducing an oxide, hydroxide, or salt of copper included in a solution of ethylene glycol, diethylene glycol, or triethylene glycol, the method comprising controlling a total halogen content of the solution to be less than 20 ppm by mass relative to copper and adding a water-soluble polymer as a dispersant such as polyethyleneimine and a noble metal compound or noble metal colloid for nucleation to the solution. This method makes it possible to provide copper fine particles for use in a wiring material, which are very fine as small as 50 nm or less in average particle size and high dispersibility, extremely low undesirable halogen content, and can be sintered at a low temperature.

15 Claims, 1 Drawing Sheet

(56) References Cited

OTHER PUBLICATIONS

English Abstract of JP2005307335.
English Abstract of JP2005330552.
English Abstract of JP2005097677.
English Abstract of JP2000123634.
English Abstract of JP2000077070.
English Abstract of JP2002029755.

* cited by examiner

COPPER FINE PARTICLES, METHOD FOR PRODUCING THE SAME, AND COPPER FINE PARTICLE DISPERSION

TECHNICAL FIELD

The present invention relates to copper fine particles, a method for producing the same, and a copper fine particle dispersion. More specifically, the present invention relates to copper fine particles which have a very small particle size and a low impurity content, can be sintered at a low temperature, and are particularly useful for producing an electrical wiring material for electronic parts.

BACKGROUND ART

Metal fine particles have been conventionally used for producing an electrical wiring material for electronic parts in the form of a conductive paste for use in, for example, printed wiring, interconnects on semiconductor devices, and contacts on a printed wiring board to electronic parts. Particularly, unlike typical submicron or larger particles, metal fine particles having a particle size of 100 nm or less can be sintered at an extremely low temperature, and therefore the application of such metal fine particles to low-temperature sintering pastes and the like has been contemplated.

Recently, it is particularly focused on a technique that forms an electrical wiring by sintering, at a low temperature, a wiring pattern printed in a metal fine particle-containing ink by an inkjet printer, and this technique is being actively researched and developed. An inkjet printer ink for use in this technique is required to maintain the dispersibility of metal fine particles contained therein for a long period of time, and therefore the particle size needs to be even smaller as compared with the conventional metal fine particles. It is to be noted that in the case of a pigment-based ink now practically used in the inkjet printer, an organic pigment or carbon black contained therein is generally required to be 50 to 200 nm in particle size.

On the other hand, metal fine particles for use in inkjet printer ink are desired to have a particle size of 50 nm or less from the viewpoint of dispersibility. The reason for this is as follow. For example, in the case of an inkjet printer ink containing copper fine particles as metal fine particles, the density of an organic pigment or carbon black is 1.5 to 2.5 g/cm$^3$, whereas the density of metal copper is 8.96 g/cm$^3$ that is about 4 to 6 times that of the organic pigment or carbon black. Therefore, in order to achieve the same degree of precipitation velocity as the organic pigment or carbon black, the copper fine particles are required to have a particle size of about 12.5 to 50 nm, which is determined in consideration of the above-described density difference using the known Stokes equation for calculating the precipitation velocity of a fine particle in a dispersion, assuming a dispersion medium is water and the density of the organic pigment is 1.5 g/cm$^3$.

In the case of a conductive paste for use as an electrical wiring material for electronic parts, it is known that impurities remaining in wiring cause a problem and that halogen is particularly harmful. More specifically, the presence of a large amount of impurity element in wiring promotes corrosion of a wiring metal, which causes migration or movement of a metal element to an insulated area. Consequently, insulation failure is likely to occur. The influence of such migration on recent fine-pitch patterns of wiring for electronic devices is more serious than that of conventional ones. Unlike the sintering process at a high temperature, the sintering process at a low temperature, particularly at 300° C. or less, offers little chance to remove an impurity element by volatilization during sintering. Therefore, it is necessary to avoid contamination of a conductive paste by undesirable impurities as much as possible.

As a method for producing metal fine particles for use in conductive paste, a chemical method has been proposed which produces metal fine particles in a solution phase. In general, the chemical method reduces a metal compound by using a reducing agent in a solution. A polyol process is well known as a method for synthesizing metal fine particles in a concentrated system adjusted to the mass production. As disclosed in, for example, Japanese Patent Application Laid-Open No. 59-173206, a polyol process heats and reduces an oxide of copper such as copper oxide or a salt of copper to copper metal in a polyol. The polyol in this process plays three roles of a solvent, a reducing agent, and a protective agent.

The polyol process makes it possible to obtain metal fine particles having a particle size of the order of submicrons to microns even in a concentrated system. Particularly, by using a metal compound, such as a metal oxide or a metal hydroxide, as a starting material, it is possible to obtain metal fine particles that do not contain undesirable impure elements for industrial application. Further, it is known that metal fine particles having a very small particle size can be obtained by appropriately selecting the kind of polyol used, reaction temperature, and raw materials. However, it is very difficult for the conventional polyol process to synthesize metal fine particles, especially copper fine particles, having both a particle size of 100 nm or less and high dispersibility.

Further, JP-A No. 2003-166006 proposes a method for producing copper fine particles using a polyol process, in which copper compounds having a particle size of less than 200 nm are suspended in a polyol solvent and are then reduced under pressurized hydrogen at a temperature of less than 150° C. However, as described above, this method needs heating under pressurized hydrogen, which not only requires the use of a complicated apparatus but also involves danger. Further, the particle size of obtained copper fine particles is about 50 nm at minimum.

Further, a method for producing copper fine particles having an average particle size of 50 nm or less using a polyol process has been proposed, in which copper oxide or copper hydroxide is used as a starting material and noble metal ions are added as a nucleation agent. For example, JP-A No. 2005-307335 proposes a method for producing copper fine particles, in which an oxide, hydroxide, or salt of copper is heated and reduced in a solution of ethylene glycol, diethylene glycol, or triethylene glycol containing noble metal ions for nucleation, polyvinylpyrrolidone as a dispersant, and an amine-based organic compound as a reduction reaction controller. Further, JP-A No. 2005-330552 proposes a method for producing copper fine particles, which is the same as the method disclosed in JP-A No. 2005-307335 except that palladium ions and polyethyleneimine are respectively added as a nucleation agent and a dispersant to the polyol solution before the heating and reducing step.

These methods make it possible to obtain copper fine particles having an average particle size of 50 nm or less, but the use of palladium ammonium chloride or palladium chloride for nucleation makes it impossible to avoid contamination of the copper fine particles by an undesirable halogen. Further, in these methods, an alkaline inorganic compound can be added if necessary, but this may unfavorably create copper fine particles contaminated by an undesirable alkali metal element. Among various undesirable elements, chlorine ions are particularly strongly adsorbed to generated copper fine particles, and therefore cannot be removed even by washing after synthesis. Further, the polymer coating layer over the copper fine particles becomes a factor that inhibits sintering, and therefore if the polymer coating layer is too thick, the sintered copper fine particles cannot have satisfactory conductivity, on the other hand, if the polymer coating layer is too thin, the copper fine particles are poor in long-term dispersibility in the solution and lose oxidation resistance.

Further, JP-A. Nos. 2005-097677 and 2000-123634 describe that a conductive paste is sintered in a hydrogen atmosphere or vacuum atmosphere to form wiring. However, such firing in a hydrogen atmosphere or vacuum atmosphere requires the use of an apparatus having a complicated structure and creates concerns about safety. Under the circumstances, there is a demand for an ink or a paste which contains copper fine particles which can be sintered under simpler conditions. Further, the above-described methods include sintering at a high temperature of 250° C. or higher, which limits substrate materials that can be used. Therefore, there is a demand for development of a paste that can be sintered at a lower temperature.

Patent Document 1: Japanese Patent Application Laid-Open No. 59-173206
Patent Document 2: JP-A No. 2003-166006
Patent Document 3: JP-A No. 2005-307335
Patent Document 4: JP-A No. 2005-330552
Patent Document 5: JP-A No. 2005-097677
Patent Document 6: JP-A No. 2000-123634

DISCLOSURE OF THE INVENTION

Problems to be Solved by the Invention

The present invention has been made in view of the above-described circumstances, and it is an object of the present invention to stably produce copper fine particles having an extremely low undesirable halogen content, a very small particle size, and high dispersibility at low cost. More specifically, it is an object of the present invention to provide copper fine particles for use in an electrical wiring material, to provide a method for producing the same, and to provide a dispersion containing the copper fine particles, in which the copper fine particles are produced by using a polyol process (which is a solution-phase method suitable for mass production), have an average particle size of 50 nm or less and a halogen content of less than 20 ppm by mass, and can be sintered at a low temperature.

Means for Solving the Problems

In order to achieve the above object, the inventors have intensively studied a method for producing copper fine particles using a polyol process. As a result, the inventors have found that a halogen as a contaminant is derived from raw materials and therefore reducing the halogen content in raw materials makes it possible to obtain copper fine particles having an extremely low undesirable halogen content. Further, the inventors have also found that copper fine particles having a very small particle size can be obtained by keeping a good dispersed state in a solution with the use of a certain dispersant. These findings have led to the completion of the present invention.

More specifically, the present invention provides a first method for producing copper fine particles by heating and reducing an oxide, hydroxide, or salt of copper included in a solution of ethylene glycol, diethylene glycol, or triethylene glycol, the method including a step of controlling the total halogen content of the solution to be less than 20 ppm by mass relative to copper and a step of adding a water-soluble polymer as a dispersant and a noble metal compound or noble metal colloid for nucleation to the solution.

In the first method for producing copper fine particles according to the present invention, the water-soluble polymer is preferably polyethyleneimine, and the weight ratio of the amount of the polyethyleneimine added to the amount of copper is preferably in the range of 0.005 to 0.1. More preferably, the water-soluble polymer is a mixture of the polyethyleneimine and at least one of polyvinylpyrrolidone and polyallylamine, and the weight ratio of the total amount of the polyvinylpyrrolidone and polyallylamine added to the amount of copper is in the range of 0.01 to 0.8.

Further, in the first method for producing copper fine particles according to the present invention, the mass ratio of the amount of a noble metal contained in the noble metal compound or noble metal colloid to the amount of copper is preferably in the range of 0.0004 to 0.01.

The present invention also provides copper fine particles obtained by the first method for producing copper fine particles according to the present invention, which are coated with the water-soluble polymer, contain a noble metal, and have a halogen content of less than 20 ppm by mass relative to copper and an average particle size of 50 nm or less.

The present invention also provides a second method for producing copper fine particles, the method including a step of adding hydroxycarboxylic acid or a hydroxycarboxylic acid solution to a solution containing copper fine particles obtained by the first method for producing copper fine particles according to the present invention to replace part of the water-soluble polymer adsorbed to the copper fine particles with hydroxycarboxylic acid so that the amount of the water-soluble polymer adsorbed to the copper fine particles becomes less than 1.5% by mass.

The present invention also provides copper fine particles obtained by the second method for producing copper fine particles according to the present invention, which are coated with the water-soluble polymer and hydroxycarboxylic acid, contain a noble metal, and have a halogen content of less than 20 ppm by mass relative to copper and an average particle size of 50 nm or less, wherein the amount of the water-soluble polymer adsorbed to copper is less than 1.5% by mass.

The present invention also provides a copper fine particle dispersion obtained by performing solvent replacement with a polar solvent and concentration on a solution containing copper fine particles obtained by the first or second method for producing copper fine particles according to the present invention, which exhibits a volume resistivity of less than 100 $\mu\Omega\cdot$cm when applied onto a substrate and then sintered at 220° C. for 1 hour in an atmosphere of nitrogen.

EFFECTS OF THE INVENTION

According to the present invention, it is possible to produce copper fine particles having an extremely low undesirable halogen content, a very small particle size, and extremely high dispersibility from general industrial materials at low cost without the need to use a special apparatus such as a high-pressure container or the like.

Therefore, the copper fine particles and the copper fine particle dispersion according to the present invention are suitable as materials for producing an electrical wiring material that can be sintered at a low temperature, adapted to use for wiring of fine-pitch patterns, and particularly useful as materials for producing ink for an inkjet printer.

BEST MODE FOR CARRYING OUT THE INVENTION

Figure 1:
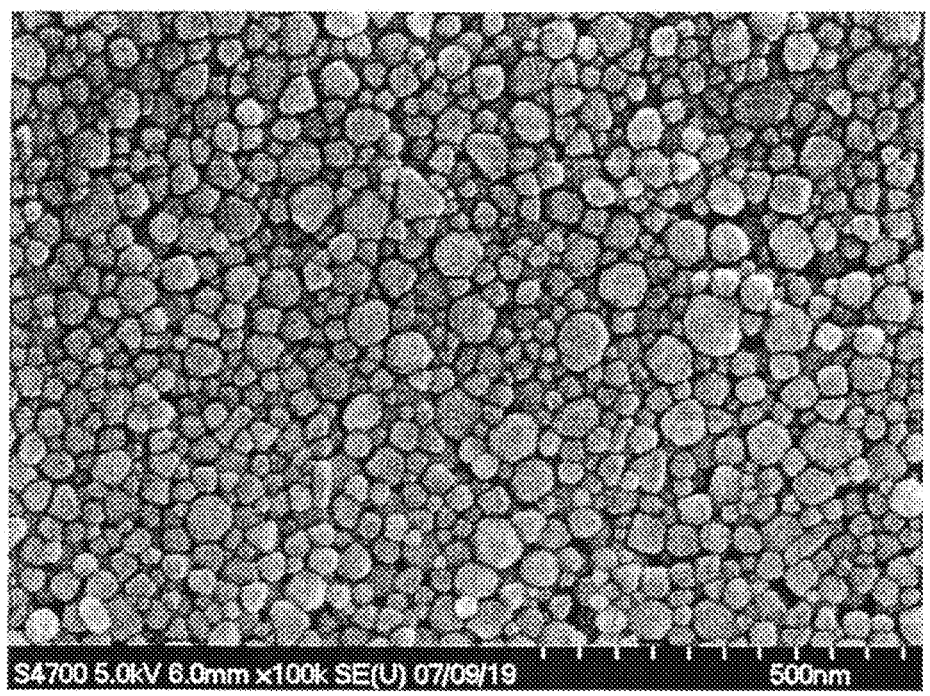
FIG. 1 is an SEM micrograph of copper fine particles obtained in Example 1 (magnification: 100000×).

A method for producing copper fine particles according to the present invention is based on a polyol process and is intended to synthesize copper fine particles in a solution phase by heating and reducing an oxide, hydroxide, or salt of copper as a copper source included in a solution of ethylene glycol, diethylene glycol, or triethylene glycol. Particularly, in the method according to the present invention, the total halogen content in raw materials is controlled to be less than 20 ppm by mass relative to copper, which makes it possible to obtain copper fine particles whose halogen content is as low as less than 20 ppm by mass.

A halogen, especially chlorine, is not only adsorbed to the surface of copper fine particles but also incorporated into the inside thereof. Therefore, it is very difficult to remove a halogen from copper fine particles to reduce the halogen content in the copper fine particles to a level acceptable for materials for electronic parts, that is, to less than 20 ppm by mass relative to copper contained in the copper fine particles. Therefore, in the method according to the present invention, it is important to use raw materials containing no halogen. More specifically, it is important that the total amount of a halogen contained not only in an oxide, hydroxide, or salt of copper as a copper source but also in ethylene glycol, diethylene glycol, or triethylene glycol, a water-soluble polymer as a dispersant, and a noble metal compound or noble metal colloid for nucleation is less than 20 ppm by mass relative to copper.

First, the halogen content in an oxide, hydroxide, or salt of copper for use as a copper source is preferably less than 5 ppm by mass. The oxide, hydroxide, or salt of copper is not particularly limited as long as the halogen content therein is low. For example, oxides, hydroxides, or salts of copper usually used in a polyol process such as oxides of copper (e.g., copper (I) oxide and copper(II) oxide), hydroxides of copper (e.g., copper hydroxide), or salts of copper (e.g., copper(II) acetate) can be used. However, copper sources having a high halogen content can also be used as long as the halogen content therein can be reduced to less than 5 ppm by mass by washing. It is preferred that these copper sources are used in the common form of powder.

A noble metal compound to be used for nucleation is not particularly limited as long as it can be more easily reduced than copper in a polyol solution. However, halogen-containing noble metal compounds cannot be used because of the need to eliminate an undesirable halogen. Even when a noble metal compound containing no halogen is used, caution should be taken because there is a case where the noble metal compound contains a halogen as impurities. The halogen content in the noble metal compound is not particularly limited as long as the halogen content in the above-described solution is less than 20 ppm by mass relative to copper.

The noble metal compound can be added in the form of powder, but is preferably added in the form of its solution dissolved in a polar solvent such as water. Accordingly, it is possible to evenly disperse the noble metal compound in a polyol solution and therefore to form uniform and very fine noble metal particles. This makes it possible to obtain uniform and very fine copper particles. For this reason, a noble metal compound soluble in a polar solvent, that is, a water-soluble noble metal compound is preferably used. Particularly, palladium nitrate or palladium ammonium nitrate containing no halogen is preferred.

The noble metal compound may be a noble metal hydroxide or noble metal oxide having low solubility. Noble metal compounds suitable as a nucleation material, such as the above-mentioned palladium nitrate and palladium ammonium nitrate, contain strongly-oxidizing nitrate ions, but noble metal hydroxides and noble metal oxides contain no strongly-oxidizing ions such as nitrate ions nor undesirable elements. Therefore, noble metal hydroxides and noble metal oxides are industrially advantageous in that it is possible to eliminate the effect of oxidizing ions that suppress reduction, thereby enabling reduction to be performed at a lower temperature.

Alternatively, a noble metal colloid may be used for nucleation necessary to generate copper fine particles. By using a noble metal colloid, it is possible to perform synthesis of a noble metal colloid separately from the production of copper fine particles. This makes it possible to synthesize a noble metal colloid under optimum conditions and therefore to easily control the particle size of noble metal fine particles contained in the colloid. The noble metal fine particles serve as nuclei to generate copper fine particles, and therefore the control of the particle size of the noble metal fine particles makes it possible to more easily control the particle size of copper fine particles and therefore to obtain copper fine particles having a more uniform particle size. By performing displacement washing of the noble metal colloid with the use of, for example, an ultrafiltration membrane, it is possible to prevent the entry of not only the above-mentioned undesirable elements but also components unnecessary for generation of copper fine particles into a reaction system as much as possible. Particularly, as in the case of using the noble metal compound, also in this case, the halogen content is preferably controlled to be less than about 20 ppm by mass relative to copper.

The noble metal colloid preferably has a lower ionization tendency than copper to prevent the occurrence of substitution reaction in a polyol solution. Preferred examples of this noble metal colloid include a silver colloid, a palladium colloid, a platinum colloid, and a gold colloid. The average particle size of noble metal fine particles, which are contained in the colloid to be added as nuclei, is preferably 20 nm or less, more preferably 10 nm or less because the particle size of finally-obtained copper fine particles is inversely proportional to the number of noble metal nuclei added and the amount of an expensive noble metal used is preferably minimized. If the average particle size of the noble metal fine particles exceeds 20 nm, the particle size of finally-obtained copper fine particles becomes too large and, in addition, the production cost of copper fine particles rises due to an increase in the amount of a noble metal used.

The noble metal colloid may be a commercially-available one, but can be easily synthesized by a known polyol process, for example, by simply adding a water-soluble noble metal compound and a water-soluble polymer to a polyol solution. Preferred examples of the water-soluble noble metal compound include compounds containing no halogen such as palladium nitrate and palladium ammonium nitrate. Preferred examples of the water-soluble polymer include polyvinylpyrrolidone and the like. The amounts of the water-soluble noble metal compound and the water-soluble polymer to be added are determined by taking synthesis conditions such as temperature into consideration so that noble metal fine particles having a desired particle size can be obtained. For example, when a water-soluble noble metal compound is added in an amount of 5 g/l as a palladium concentration and a water-soluble polymer is added in an amount of 10 g/l, a palladium colloid containing fine particles having a particle size of 10 to 15 nm can be obtained.

The noble metal compound or noble metal colloid for nucleation is added in such an amount that the mass ratio of a noble metal to copper (i.e., the mass ratio of noble metal/Cu) is preferably 0.0004 to 0.01, more preferably 0.0005 to 0.005, irrespective of the form thereof. If the mass ratio of noble metal/Cu is less than 0.0004, the amount of noble metal fine particles is not sufficient, and therefore the reduction reaction of copper or the formation of copper fine particles does not satisfactorily proceed, and even when copper fine particles are formed, there is a case where the particle size of the copper fine particles exceeds 50 nm because the number of noble metal fine particles serving as nuclei is low. On the other hand, if the mass ratio of noble metal/Cu exceeds 0.01, copper fine particles can be obtained, but there is a disadvantage that the effect of reducing the particle size of copper fine particles is not proportional to the amount of an expensive noble metal added.

Particularly preferably, a noble metal constituting the noble metal compound or noble metal colloid for nucleation is palladium (Pd). In this case, the mass ratio of Pd/Cu is preferably 0.0006 to 0.005, more preferably 0.0006 to 0.003. This makes it possible to obtain copper fine particles which are highly uniform in particle size and have an average particles size of 50 nm or less.

As a polymer to be added as a dispersant, a water-soluble polymer is used for being dissolved in a polyol solution that is a polar solvent. The water-soluble polymer has the function of coating the surface of noble metal fine particles precipitated by reduction or added and the surface of copper fine particles to provide steric hindrance to prevent these fine particles from coming into contact with each other, and therefore agglomeration hardly occurs, thereby promoting the generation of copper fine particles having high dispersibility. The water-soluble polymer is not particularly limited as long as it can be dissolved in ethylene glycol, diethylene glycol, or triethylene glycol as a polar solvent and can be adsorbed to generated noble metal fine particles and copper fine particles to provide steric hindrance. Preferred examples of the water-soluble polymer include polyethyleneimine, polyvinylpyrrolidone, and polyallylamine. Among them, polyethyleneimine is particularly preferred.

When a halogen is eliminated from a reaction system as much as possible, there is a case where the adsorption of the water-soluble polymer to the surface of copper fine particles does not proceed, and therefore the above-described effect of steric hindrance, that is, the effect of preventing agglomeration cannot be satisfactorily obtained. More specifically, when a polyol solution contains a halogen in large amounts, the halogen is adsorbed to the surface of copper fine particles, and the water-soluble polymer is further adsorbed to the halogen, and therefore the surface of the copper fine particles is sufficiently coated with the water-soluble polymer. On the other hand, when a halogen is eliminated from a reaction system, the amount of the halogen adsorbed to the surface of copper fine particles is a little, and therefore the surface of the copper fine particles is not sufficiently coated with the water-soluble polymer. However, in the case of using polyethyleneimine as the water-soluble polymer, the surface of copper fine particles can be sufficiently coated with polyethyleneimine adsorbed thereto because polyethyleneimine has an imine group having a high electronic affinity for copper, and therefore has a high ability to adsorb to copper fine particles.

Polyethyleneimine (PEI) as the water-soluble polymer is added in such an amount that the mass ratio of PEI to copper (i.e., the mass ratio of PEI/Cu) is preferably 0.005 to 0.1, more preferably 0.01 to 0.03. If the mass ratio of PEI/Cu is less than 0.005, the surface coverage of fine particles is lowered so that agglomeration of noble metal fine particles serving as nuclei or agglomeration of generated copper fine particles occurs during reaction, and therefore coarse copper particles are finally obtained. On the other hand, if the mass ratio of PEI/Cu exceeds 0.1, the viscosity of an obtained solution becomes too high, which is disadvantageous in that the subsequent solvent replacement with a polar solvent and concentration process take much time, and in addition, the amount of the water-soluble polymer remaining after concentration is large.

In general, the ability of a polymer dispersant to adsorb to target fine particles varies depending on the kind of adsorbing group. Therefore, a mixture of two or more different polymer dispersants, e.g., a mixture of a polymer dispersant for dispersing noble metal fine particles added or generated in the early-stage of reaction and a polymer dispersant for dispersing copper fine particles generated by precipitation of copper on the noble metal fine particles by reduction is effectively used. More specifically, it is particularly preferred that at least one of polyvinylpyrrolidone and polyallylamine is used in addition to the above-mentioned polyethyleneimine.

In this case, polyvinylpyrrolidone (PVP) and/or polyallylamine (PAA) are/is added in such an amount that the mass ratio of the total amount of PVP and PAA to copper (i.e., the mass ratio of (PVP+PAA)/Cu) is preferably 0.01 to 0.8, more preferably 0.01 to 0.5. The addition of polyvinylpyrrolidone and/or polyallylamine makes it possible to obtain finer noble metal particles serving as nuclei, but if the mass ratio of the total amount of PVP and PAA to copper is less than 0.01, the addition of PVP and/or PAA has no effect. On the other hand, if the mass ratio of the total amount of PVP and PAA to copper exceeds 0.8, as in the case of adding polyethyleneimine, the viscosity of an obtained solution becomes too high, which is disadvantageous in that the subsequent solvent replacement with a polar solvent and concentration process take much time, and in addition, the amount of the water-soluble polymer remaining after concentration is large.

If the water-soluble polymer contains a halogen, the halogen remains in finally-obtained copper fine particles or a dispersion of the copper fine particles. Therefore, it is necessary to use a water-soluble polymer having a low halogen content. More specifically, the total halogen content in water-soluble polymers is preferably controlled so that the halogen content in the above-described solution becomes less than 20 ppm by mass relative to copper.

Particularly, polyethyleneimine is likely to be contaminated by a halogen during its production. However, even when polyethyleneimine to be used is contaminated by a halogen, a major part of the halogen can be removed using an anion-exchange resin. Examples of the anion exchange resin include anion exchange resins other than halogen ion-form anion exchange resins, such as $OH^-$ form anion exchange resins and $NO_3^-$ form anion exchange resins. Among these anion exchange resins, $OH^-$ form anion exchange resins having no adverse effect on reduction reaction are preferably used. Removal of a halogen from the water-soluble polymer can be performed by bringing the solution of the water-soluble polymer into contact with an anion exchange resin to perform exchange adsorption of halogen ions. The solution of the water-soluble polymer can be brought into contact with an anion exchange resin by a well-known method such as a batch method or a column method. By reducing the halogen content in the water-soluble polymer to less than 1000 ppm by mass, preferably less than 400 ppm by mass, it is possible to finally obtain copper fine particles whose halogen content is less than 20 ppm by mass.

Hereinbelow, the method for producing copper fine particles according to the present invention will be more specifically described. A polyol to be used is any one of ethylene glycol (EG), diethylene glycol (DEG), and triethylene glycol (TEG) or a mixture of two or more of them. The method according to the present invention can be carried out by an apparatus usually used in a polyol process, but one having an inner surface less likely to adsorb copper fine particles is preferably used. For example, a glass container or a metal container coated with, for example, a fluorine resin is used. Further, the apparatus is preferably equipped with a stirrer to homogeneously perform a reduction reaction.

First, a copper source and a noble metal compound or noble metal colloid are added to a polyol solution, and a water-soluble polymer is also added thereto as a dispersant. The polyol solution containing these raw materials is heated to and maintained at a predetermined temperature under stirring, and as a result, copper fine particles are generated. When heated to and maintained at a predetermined temperature, the polyol solution is preferably stirred to perform reaction homogeneously. The polyol solution has an antioxidant effect, but nitrogen gas bubbling in the polyol solution is preferable when the polyol solution is heated to and maintained at a predetermined temperature in order to promote a reduction reaction and prevent reoxidation of copper fine particles.

Usually, heating of the polyol solution is started after the addition of the copper source, the noble metal compound or noble metal colloid, and the water-soluble polymer. However, the noble metal compound or noble metal colloid may be added later during heating of the polyol solution containing raw materials other than the noble metal compound or noble metal colloid to generate uniform and fine nuclei for forming copper fine particles. Further, as in the case of the noble metal compound or noble metal colloid, part or all of the water-soluble polymer may be added later during heating of the polyol solution.

In order to synthesize uniform copper fine particles, the maximum ultimate temperature of the polyol solution is set to 120 to 200° C. If the maximum ultimate temperature of the polyol solution is less than 120° C., the reduction reaction rate of copper is decreased so that it takes longer time to complete the reduction reaction, and in addition, coarse copper particles are finally obtained. On the other hand, if the maximum ultimate temperature of the polyol solution exceeds 200° C., the protective effect of the polymer dispersant is reduced, which is disadvantageous in that cohesive coarse particles are obtained.

The above-described method for producing copper fine particles according to the present invention makes it possible to obtain copper fine particles containing a noble metal, having a halogen content of less than 20 ppm by mass and an average particles size of 50 nm or less, and coated with the water-soluble polymer. If the average particle size of the copper fine particles exceeds 50 nm, low-temperature sintering effect required for forming a fine wiring pattern cannot be satisfactorily obtained, and in addition, there is a case where the copper fine particles are precipitated when used as a material of inkjet printer ink.

It is not preferable that the halogen content in finally-obtained copper fine particles is 20 ppm by mass or more, because migration or corrosion occurs when the copper fine particles are used as a material for electronic parts, especially as a material of electrical wiring material. The halogen content in finally-obtained copper fine particles has an influence on the volume resistivity of a conductive film obtained by sintering the copper fine particles. More specifically, when the halogen content in finally-obtained copper fine particles is lower, a conductive film obtained by sintering the copper fine particles has lower volume resistivity on the condition that the amount of the water-soluble polymer adsorbed to the copper fine particles is constant. Therefore, by reducing the halogen content in finally-obtained copper fine particles, it is possible to maintain the volume resistivity of a conductive film obtained by sintering the copper fine particles at a low level even when the amount of the water-soluble polymer adsorbed to the copper fine particles is increased to achieve high dispersibility.

As described above, the surface of finally-obtained copper fine particles is coated with the water-soluble polymer. However, the water-soluble polymer is a factor that inhibits sintering, and therefore a larger amount of the water-soluble polymer tends to be lower conductivity of a conductive film obtained by sintering the copper fine particles. In order to allow a conductive film obtained by sintering copper fine particles at a low temperature to have low volume resistivity, the amount of the water-soluble polymer adsorbed to the surface of the copper fine particles is preferably less than 1.5% by mass. If the amount of the water-soluble polymer exceeds 1.5% by mass, a conductive film obtained by sintering the copper fine particles at a low temperature has high volume resistivity, which is disadvantageous to a wiring material.

Therefore, in the present invention, in order to reduce the amount of the water-soluble polymer adsorbed to the surface of copper fine particles, the water-soluble polymer may be replaced with hydroxycarboxylic acid. More specifically, part of the water-soluble polymer adsorbed to the surface of copper fine particles to form a coating may be replaced with hydroxycarboxylic acid by adding hydroxycarboxylic acid or a hydroxycarboxylic acid solution to a solution containing obtained copper fine particles while the solution is stirred to keep the copper fine particles dispersed. The water-soluble polymer liberated from the copper fine particles is discharged by ultrafiltration. It is to be noted that when the amount of the water-soluble polymer adsorbed to the surface of copper fine particles is lower, the conductivity of a conductive film obtained by sintering the copper fine particles is higher, but the oxidation resistance of the copper fine particles is worse. However, oxidation can be suppressed by a coating of hydroxycarboxylic acid.

Preferred examples of the hydroxycarboxylic acid include lactic acid, gluconic acid, malic acid, and citric acid. These hydroxycarboxylic acids can be used singly or in combination of two or more of them in view of solubility in a solvent and viscosity control. The amount of hydroxycarboxylic acid to be added is preferably less than 20% by mass, more preferably 1 to 10% by mass relative to a solution containing obtained copper fine particles. It is not preferable that the amount of hydroxycarboxylic acid added exceeds 20% by mass, because the dissolution of copper fine particles is promoted, thereby causing oxidation and agglomeration of the copper fine particles.

By replacing part of the water-soluble polymer adsorbed to the surface of copper fine particles with hydroxycarboxylic acid in such a manner as described above, it is possible to obtain copper fine particles coated with the water-soluble polymer in an amount of less than 1.5% by mass and hydroxycarboxylic acid, containing a noble metal, and having a halogen content of less than 20 ppm by mass and an average particle size of 50 nm or less. The thus obtained copper fine particles are suitable as metal fine particles constituting an ink or paste specifically designed for a technique that is being actively researched and developed recently to form a fine wiring pattern by printing using an inkjet printer or by screen printing. The copper fine particles can maintain their high dispersibility in the ink or paste.

The copper fine particles according to the present invention can be obtained in a state where they are dispersed in a solution of ethylene glycol, diethylene glycol, or triethylene glycol. However, the solution contains not only the copper fine particles but also an excess of the water-soluble polymer. If the water-soluble polymer is excessively contained in a conductive paste to be finally used as a wiring material, there is a case where problems such as an increase in electrical resistance and structural defect will occur.

Therefore, the water-soluble polymer is preferably removed as much as possible from the polyol solution containing copper fine particles obtained by the method according to the present invention by performing solvent replacement with a polar solvent such as a water, an alcohol, or an ester and concentration on the polyol solution so that a dispersion in which the copper fine particles are dispersed in the polar solvent is obtained. It is to be noted that the polar solvent to be used is preferably any one of water, an alcohol and an ester or a mixture of two or more of them.

The dispersion of copper fine particles is generally prepared in the following manner. The polyol solution containing copper fine particles obtained by the method according to the present invention is diluted with a polar solvent such as a water, an alcohol, or an ester, and then solvent replacement and concentration are performed on the polyol solution by, for example, ultrafiltration. Then, if necessary, a series of dilution with a polar solvent, solvent replacement, and concentration is repeated to adjust a copper concentration and an impurity content to obtain a copper fine particle dispersion having desired copper concentration and impurity content. Further, in order to improve film formability, an additive such as hydroxycarboxylic acid may be added. The amount of hydroxycarboxylic acid to be added is preferably less than 20% by mass, more preferably 1 to 10% by mass relative to the dispersion as in the above-described case where hydroxycarboxylic acid is added to a solution containing copper fine particles to replace a water-soluble polymer with hydroxycarboxylic acid.

The thus obtained copper fine particle dispersion according to the present invention is a dispersion in which copper fine particles are dispersed in a polar solvent. When the copper fine particle dispersion is applied onto a glass substrate or a resin substrate such as a polyimide substrate and then sintered at 220° C. for 1 hour in an atmosphere of nitrogen, the thus obtained conductive copper film has a volume resistivity of less than 100 µΩ·cm. The volume resistivity of the conductive copper film is influenced not only by the water-soluble polymer content but also by the halogen content, and therefore when the halogen content is lower, the volume resistivity is lower. The copper fine particle dispersion according to the present invention is suitable for producing an ink or paste for use in the technique of forming a fine wiring pattern by printing.

EXAMPLES

Copper fine particles were produced from the following raw materials in the following examples.

Copper Source: copper oxide ($Cu_2O$) (manufactured by Chemet)

Noble Metal Compound: palladium ammonium nitrate (manufactured by N.E. CHEMCAT CORPORATION)

Polyol Solvent: ethylene glycol (EG) (manufactured by Nippon Shokubai Co., Ltd.)

Dispersant: polyvinylpyrrolidone (PVP) having a molecular weight of 10,000 (manufactured by ISP Japan Ltd.), polyethyleneimine (PEI) having a molecular weight of 1,800 (manufactured by Nippon Shokubai Co., Ltd.)

Additive: citric acid (special grade, manufactured by Wako Pure Chemical Industries, Ltd.)

Example 1

600 g of copper oxide ($Cu_2O$) powder with a chlorine content of 40 ppm by mass was added to 3 L of a 0.1 mol/l aqueous sodium hydroxide solution to obtain a suspension, and the suspension was stirred at 80° C. for 1 hour and then filtered to collect copper oxide ($Cu_2O$). The copper oxide ($Cu_2O$) was added to 3 L of pure water, stirred for 30 minutes, filtered, and vacuum-dried at 80° C. to obtain washed $Cu_2O$ powder. The chlorine content in the washed $Cu_2O$ powder was 2 ppm by mass relative to Cu.

On the other hand, 10 g of polyethyleneimine (PEI) with a chlorine content of 3000 ppm by mass was diluted with water so that the concentration of PEI was 10% by mass to obtain a solution of PEI, and then 10 g of an anion exchange resin (SA-10A manufactured by Mitsubishi Chemical Corporation) converted to the $OH^-$ form using an aqueous sodium hydroxide solution was added thereto, and the PEI solution containing the anion exchange resin was stirred for 8 hours. Then, the anion exchange resin was removed by filtration, and the residue was vacuum-dried at 80° C. to obtain washed PEI. The chlorine content in the washed PEI was 200 ppm by mass.

110 g of the washed $Cu_2O$ powder, 1.5 g of the washed PEI, and 40 g of polyvinylpyrrolidone (PVP) with a chlorine content of 3 ppm by mass were added to 1 L of ethylene glycol (EG) as a solvent to obtain a solution, and the solution was heated under stirring while a nitrogen gas was blown into the solution. Then, a palladium solution obtained by dissolving palladium ammonium nitrate in ammonia water was added to the solution in an amount corresponding to 0.1 g of palladium, and then the temperature of the solution was maintained at 160° C. for 30 minutes to precipitate copper fine particles by reduction. The total chlorine content in the raw materials was 6 ppm by mass relative to copper, the mass ratio of PEI to Cu was 0.015, and the mass ratio of palladium to Cu (Pd/Cu) was 0.001.

The obtained copper fine particles were collected by filtration and observed by SEM. As a result, agglomeration was not observed. The copper fine particles had an average particle size d of 40 nm and a relative standard deviation (standard deviation σ/average particle size d) of 53%. FIG. 1 is an SEM micrograph of the copper fine particles. It is to be noted that particle size measurement was performed by observation using SEM in the following manner. The copper fine particles were observed using a field-emission electron microscope (FE-SEM, S-4700) manufactured by Hitachi, Ltd., 200 particles were randomly selected within a field of view, the particle size of each of the 200 particles was measured to determine an average particle size and a relative standard deviation (standard deviation σ/average particle size d) by calculation. Also in the following examples and comparative examples, an average particle size and a relative standard deviation were determined in the same manner as in Example 1.

Then, a major part of the solvent, ethylene glycol (EG) of the solution containing the obtained copper fine particles was replaced with water to prepare a copper fine particle dispersion. More specifically, a washing liquid obtained by adding 10 g of citric acid to 1 L of a mixed solvent of pure water and ethylene glycol (pure water:ethylene glycol=8:1) was added to 1 L of the obtained solution containing copper fine particles (Cu: 10% by weight), and the thus obtained solution was concentrated to about 1/10 volume by ultrafiltration. Then, the same washing liquid as described above was added thereto so that a total volume was 2 L, and then ultrafiltration was performed to discharge a filtrate, that is, a mixture of pure water and ethanol to the outside of the system so that the solution containing copper fine particles was concentrated to 100 cc.

Further, the same washing liquid as described above was again added to the concentrated solution so that a total volume was 1 L. Then, the thus obtained solution was subjected to ultrafiltration to discharge a filtrate to the outside of the system so that the original solution was diluted to 1/10. This process was repeated once more so that the concentration of the reaction solvent was 1/20000 of its original value. Then, the thus obtained solution subjected to solvent replacement and concentration was collected, and as a result, 50 cc of a copper fine particle dispersion was obtained. The copper fine particle dispersion was analyzed, and the result of analysis was as follows: Cu: 57% by mass, Cl: 6 ppm by mass, Pd: 0.05% by mass, Na: less than 10 ppm by mass, Mg: less than 10 ppm by mass: and the rest being pure water and ethylene glycol. It is to be noted that the chlorine content relative to copper was 11 ppm by mass.

The copper fine particle dispersion was vacuum-dried at 80° for 3 hours, and was then heated to 600° C. in an atmosphere of nitrogen to perform thermogravimetric analysis. As a result, a weight loss of 4.6% by mass was detected in a temperature range from 180 to 300° C. and a weight loss of 1.2% by mass was detected in a temperature range from 300 to 600° C. As a result of thermogravimetric analysis separately performed on citric acid, PEI, and PVP, it has been confirmed that no solid carbon remains because the decomposition of citric acid is started at about 180° and decomposition and vaporization of citric acid are almost complete at about 300° C., and the decomposition of PEI and PVP is started at about 300° C. and decomposition and vaporization of PEI and PVP are almost complete at 600° C. Consequently, it can be considered that the weight loss in a temperature range from 300 to 600° C. results from the decomposition of PEI and PVP adsorbed to copper. Therefore, the amount of the water-soluble polymer adsorbed to the copper fine particles can be 1.2% by mass.

Further, the particle size distribution of the copper fine particle dispersion was measured by a dynamic light scattering method. As a result, a particle size at 50% integrated frequency was 24 nm, which was smaller than the average particle size calculated from the SEM image. This result indicates that the obtained copper fine particle dispersion had high dispersibility. Further, the copper fine particle dispersion was left standing for 1 month after its production, but precipitation of copper fine particles was not observed. Further, the copper fine particle dispersion was applied onto a glass substrate after 1 month from its production, dried, and subjected to X-ray diffraction analysis, and as a result, the peak of copper oxide was not detected. From these results, it was confirmed that the obtained copper fine particles had excellent resistance to oxidation in spite of the fact that their average particle size was as small as 50 nm or less.

Citric acid, which is one of hydroxycarboxylic acids, was added to the copper fine particle dispersion in an amount of 5% by mass relative to the dispersion for the purpose of improving the film quality of a sintered film, and the thus obtained copper fine particle dispersion was pattern-printed on a substrate by a bar coater. The thus obtained pattern was sintered at 220° C. for 1 hour in an atmosphere of nitrogen, and as a result, it was confirmed that a copper conductive film having a volume resistivity of 70 μΩ·cm was formed. It is to be noted that the volume resistivity of the copper conductive film was determined from the thickness of the copper conductive film measured by observing the cross section of the substrate using a field-emission electron microscope (FE-SEM, S-4700) manufactured by Hitachi, Ltd. and from the surface resistivity of the copper conductive film measured by a resistivity meter (Loresta GP) manufactured by DIA Instruments Co., Ltd.

Example 2

Copper fine particles were precipitated by reduction in the same manner as in Example 1 except that the amount of the washed PEI was reduced to 1.13 g. The total chlorine content in the raw materials was 5 ppm by mass relative to copper, and the mass ratio of PEI to copper was 0.0113. The obtained copper fine particles were collected by filtration and observed by SEM, and as a result, agglomeration was not observed. The copper fine particles had an average particle size d of 31 nm and a relative standard deviation (standard deviation σ/average particle size d) of 51%.

Then, a major part of the solvent, ethylene glycol (EG) of the solution containing the obtained copper fine particles was replaced with water in the same manner as in Example 1 to prepare a copper fine particle dispersion. The thus obtained copper fine particle dispersion was analyzed, and the result of analysis was as follows: Cu: 54% by mass, Pd: 0.05% by mass, Na: less than 10 ppm by mass, Mg: less than 10 ppm by mass, Cl: 4 ppm by mass, and the rest being pure water and ethylene glycol. The chlorine content relative to copper was 7 ppm by mass.

Further, the amount of the water-soluble polymer adsorbed to the copper fine particles was determined by thermogravimetric analysis in the same manner as in Example 1 and was found to be 0.9% by mass. Further, the particle size distribution of the copper fine particle dispersion was measured by a dynamic light scattering method. As a result, a particle size at 50% cumulative frequency was 44 nm, which was inferior to that of Example 1. However, this result indicates that the obtained copper fine particle dispersion had high dispersibility. Further, the copper fine particle dispersion was left standing for 1 month after its production, but precipitation of the copper fine particles was not observed.

Further, the copper fine particle dispersion was applied onto a glass substrate after 1 month from its production, dried, and subjected to X-ray diffraction analysis in the same manner as in Example 1. As a result, the peak of copper oxide was not detected. Further, the copper fine particle dispersion was pattern-printed in the same manner as in Example 1, and was then sintered at 220° C. for 1 hour in an atmosphere of nitrogen. As a result, a copper conductive film having a volume resistivity of 81 μΩ·cm was formed.

Example 3

Copper fine particles were precipitated by reduction in the same manner as in Example 1 except that the amount of the washed PEI was reduced to 0.75 g. The total chlorine content in the raw materials was 5 ppm by mass relative to copper, and the mass ratio of PEI to copper was 0.0075. The obtained copper fine particles were collected by filtration and observed by SEM, and as a result, agglomeration was not observed. The copper fine particles had an average particle size d of 45 nm and a relative standard deviation (standard deviation σ/average particle size d) of 47%.

Then, a major part of the solvent, ethylene glycol (EG) of the solution containing the obtained copper fine particles was replaced with water in the same manner as in Example 1 to prepare a copper fine particle dispersion. The thus obtained copper fine particle dispersion was analyzed, and the result of analysis was as follows: Cu: 56% by mass, Pd: 0.05% by mass, Na: less than 10 ppm by mass, Mg: less than 10 ppm by mass., Cl: 4 ppm by mass, and the rest being pure water and ethylene glycol. The chlorine content relative to copper was 7 ppm by mass.

Further, the amount of the water-soluble polymer adsorbed to the copper fine particles was determined by thermogravimetric analysis in the same manner as in Example 1 and was found to be 0.8% by mass. Further, the particle size distribution of the copper fine particle dispersion was measured by a dynamic light scattering method. As a result, a particle size at 50% cumulative frequency was 54 nm, which was inferior to those of Examples 1 and 2. However, this result indicates that the obtained copper fine particle dispersion had high dispersibility. Further, the copper fine particle dispersion was left standing for 1 month after its production, but precipitation of the copper fine particles was not observed.

Further, the copper fine particle dispersion was applied onto a glass substrate after 1 month from its production, dried, and subjected to X-ray diffraction analysis in the same manner as in Example 1. As a result, the peak of copper oxide was not detected. Further, the copper fine particle dispersion was pattern-printed in the same manner as in Example 1, and was then sintered at 220° C. for 1 hour in an atmosphere of nitrogen. As a result, a copper conductive film having a volume resistivity of 67 μΩ·cm was formed.

Example 4

Copper fine particles were precipitated by reduction in the same manner as in Example 1 except that addition of PEI was omitted. The total chlorine content in the raw materials was 2 ppm by mass relative to copper. The obtained copper fine particles were collected by filtration and observed by SEM, and as a result, slight agglomeration was observed. The copper fine particles had an average particle size d of 42 nm and a relative standard deviation (standard deviation σ/average particle size d) of 77%.

Then, a major part of the solvent, ethylene glycol (EG) of the solution containing the obtained copper fine particles was replaced with water in the same manner as in Example 1 to prepare a copper fine particle dispersion. The thus obtained copper fine particle dispersion was analyzed, and the result of analysis was as follows: Cu: 55% by mass, Pd: 0.05% by mass, Na: less than 10 ppm by mass, Mg: less than 10 ppm by mass, Cl: 2 ppm by mass, and the rest being pure water and ethylene glycol. The chlorine content relative to copper was 4 ppm by mass.

Further, the amount of the water-soluble polymer adsorbed to the copper fine particles was determined by thermogravimetric analysis in the same manner as in Example 1 and was found to be 0.7% by mass. Further, the copper fine particle dispersion was left standing for 1 month after its production, and as a result, slight precipitation of the copper fine particles was observed.

Further, the copper fine particle dispersion was pattern-printed in the same manner as in Example 1, and was then sintered at 220° C. for 1 hour in an atmosphere of nitrogen. As a result, a copper conductive film having a volume resistivity of 68 μΩ·cm was formed.

Example 5

Copper fine particles were precipitated by reduction in the same manner as in Example 1 except that the amount of the palladium solution added was increased so that the amount of palladium added was 0.2 g. The total chlorine content in the raw materials was 6 ppm by mass relative to copper, and the mass ratio of palladium to copper (Pd/Cu) was 0.002. The obtained copper fine particles were collected by filtration and observed by SEM, and as a result, agglomeration was not observed. The copper fine particles had an average particle size d of 35 nm and a relative standard deviation (standard deviation σ/average particle size d) of 49%.

Then, a major part of the solvent, ethylene glycol (EG) of the solution containing the obtained copper fine particles was replaced with water in the same manner as in Example 1 to prepare a copper fine particle dispersion. The thus obtained copper fine particle dispersion was analyzed, and the result of analysis was as follows: Cu: 57% by mass, Pd: 0.08% by mass, Na: less than 10 ppm by mass, Mg: less than 10 ppm by mass, Cl: 7 ppm by mass, and the rest being pure water and ethylene glycol. The chlorine content relative to copper was 12 ppm by mass.

Further, the amount of the water-soluble polymer adsorbed to the copper fine particles was determined by thermogravimetric analysis in the same manner as in Example 1 and was found to be 1.1% by mass. Further, the particle size distribution of the copper fine particle dispersion was measured by a dynamic light scattering method. As a result, a particle size at 50% cumulative frequency was 30 nm, which was smaller than the average particle size calculated from the SEM image. This result indicates that the obtained copper fine particle dispersion had high dispersibility. Further, the copper fine particle dispersion was left standing for 1 month after its production, but precipitation of the copper fine particles was not observed.

Further, the copper fine particle dispersion was applied onto a glass substrate after 1 month from its production, dried, and subjected to X-ray diffraction analysis in the same manner as in Example 1. As a result, the peak of copper oxide was not detected. Further, the copper fine particle dispersion was pattern-printed in the same manner as in Example 1, and was then sintered at 220° C. for 1 hour in an atmosphere of nitrogen. As a result, a copper conductive film having a volume resistivity of 72 μΩ·cm was formed.

Comparative Example 1

Copper fine particles were precipitated by reduction in the same manner as in Example 1 except that the washed PEI was changed to unwashed PEI. In this case, the total chlorine content in the raw materials was 63 ppm by mass relative to copper. The obtained copper fine particles were collected by filtration and observed by SEM. As a result, agglomeration was not observed. The copper fine particles had an average particle size d of 29 nm and a relative standard deviation (standard deviation σ/average particle size d) was 75%.

Then, a major part of the solvent, ethylene glycol (EG) of the solution containing the obtained copper fine particles was replaced with water in the same manner as in Example 1 to prepare a copper fine particle dispersion. The thus obtained copper fine particle dispersion was analyzed, and the result of analysis was as follows: Cu: 67% by mass, Pd: 0.06% by mass, Na: less than 10 ppm by mass, Mg: less than 10 ppm by mass, Cl: 51 ppm by mass, and the rest being pure water and ethylene glycol. The chlorine content relative to copper was 76 ppm by mass. This result indicates that if a reduction in the total halogen content in raw materials is not achieved, a halogen is strongly attached to and incorporated into copper fine particles and therefore cannot be removed even by washing.

Further, the amount of the water-soluble polymer adsorbed to the copper fine particles was determined by thermogravimetric analysis in the same manner as in Example 1 and was found to be 1.2% by mass. Further, the copper fine particle dispersion was pattern-printed in the same manner as in Example 1, and was then sintered at 220° C. for 1 hour in an atmosphere of nitrogen. As a result, a copper conductive film having a volume resistivity of 117 μΩ·cm was formed.

Comparative Example 2

Copper fine particles were precipitated by reduction in the same manner as in Comparative Example 1 except that the amount of the palladium solution added was increased so that the amount of palladium added was 0.2 g. The total chlorine content in the raw materials was 63 ppm by mass relative to copper, and the mass ratio of palladium to copper (Pd/Cu) was 0.002. The obtained copper fine particles were collected by filtration and observed by SEM, and as a result, agglomeration was not observed. The copper fine particles had an average particle size d of 27 nm and a relative standard deviation (standard deviation σ/average particle size d) of 64%.

Then, a major part of the solvent, ethylene glycol (EG) of the solution containing the obtained copper fine particles was replaced with water in the same manner as in Example 1 to prepare a copper fine particle dispersion. The thus obtained copper fine particle dispersion was analyzed, and the result of analysis was as follows: Cu: 68% by mass, Pd: 0.09% by mass, Na: less than 10 ppm by mass, Mg: less than 10 ppm by mass, Cl: 44 ppm by mass, and the rest being pure water and ethylene glycol. The chlorine content relative to copper was 64 ppm by mass. As in the case of Comparative Example 1, a halogen finally remained in the copper fine particles.

Further, the amount of the water-soluble polymer adsorbed to the copper fine particles was determined by thermogravimetric analysis in the same manner as in Example 1 and was found to be 1.0% by mass. Further, the copper fine particle dispersion was pattern-printed in the same manner as in Example 1, and was then sintered at 220° C. for 1 hour in an atmosphere of nitrogen. As a result, a copper conductive film having a volume resistivity of 91 μΩ·cm was formed.

Comparative Example 3

Copper fine particles were precipitated by reduction in the same manner as in Example 3 except that the polyvinylpyrrolidone (PVP) was changed to one with a chlorine content of 54 ppm by mass. The total chlorine content in the raw materials was 25 ppm by mass relative to copper. The obtained copper fine particles were collected by filtration and observed by SEM, and as a result, agglomeration was not observed. The copper fine particles had an average particle size d of 37 nm and a relative standard deviation (standard deviation σ/average particle size d) of 55%.

Then, a major part of the solvent, ethylene glycol (EG) of the solution containing the obtained copper fine particles was replaced with water in the same manner as in Example 1 to prepare a copper fine particle dispersion. The thus obtained copper fine particle dispersion was analyzed, and the result of analysis was as follows: Cu: 45% by mass, Pd: 0.05% by mass, Na: less than 10 ppm by mass, Mg: less than 10 ppm by mass, Cl: 13 ppm by mass, and the rest being pure water and ethylene glycol. The chlorine content relative to copper was 29 ppm by mass. As in the cases of Comparative Examples 1 and 2, also in the case of using PVP containing chlorine, a halogen finally remained in the copper fine particles.

Further, the amount of the water-soluble polymer adsorbed to the copper fine particles was determined by thermogravimetric analysis in the same manner as in Example 1 and was found to be 1.2% by mass. Further, the copper fine particle dispersion was pattern-printed in the same manner as in Example 1, and was then sintered at 220° C. for 1 hour in an atmosphere of nitrogen. As a result, a copper conductive film having a volume resistivity of 76 μΩ·cm was formed.

Comparative Example 4

Copper fine particles were precipitated by reduction in the same manner as in Example 1 except that the amount of the washed PEI was changed to 15.0 g. The total chlorine content in the raw materials was 32 ppm by mass relative to copper. The obtained copper fine particles were collected by filtration and observed by SEM, and as a result, slight agglomeration was observed. The copper fine particles had an average particle size d of 25 nm and a relative standard deviation (standard deviation σ/average particle size d) of 81%.

Then, a major part of the solvent, ethylene glycol (EG) of the solution containing the obtained copper fine particles was replaced with water in the same manner as in Example 1 to prepare a copper fine particle dispersion. The thus obtained copper, fine particle dispersion was analyzed, and the result of analysis was as follows: Cu: 54% by mass, Pd: 0.05% by mass, Na: less than 10 ppm by mass, Mg: less than 10 ppm by mass, Cl: 29 ppm by mass, and the rest being pure water and ethylene glycol. The chlorine content relative to copper was 54 ppm by mass.

Further, the amount of the water-soluble polymer adsorbed to the copper fine particles was determined by thermogravimetric analysis in the same manner as in Example 1 and was found to be 3.8% by mass. Further, the copper fine particle dispersion was pattern-printed in the same manner as in Example 1, and was then sintered at 220° C. for 1 hour in an atmosphere of nitrogen. As a result, a copper conductive film having a volume resistivity of 2000 μΩ·cm was formed.

Figure 2:
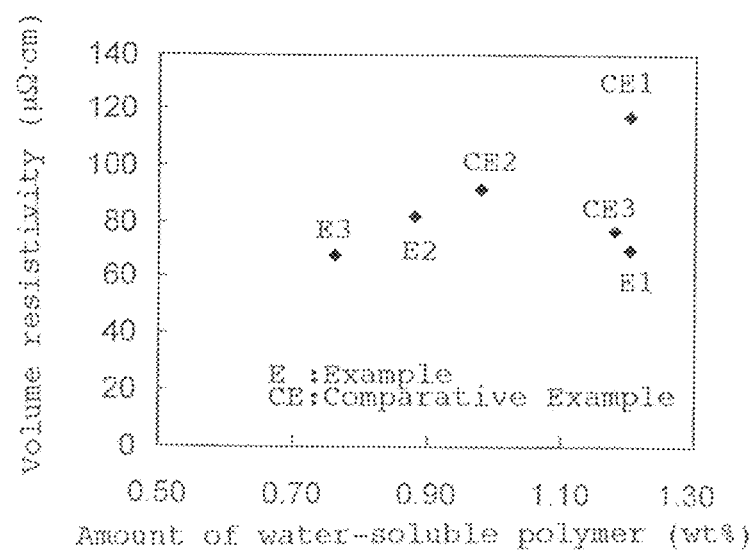
FIG. 2 is a graph showing the relationship between the amount of a water-soluble polymer adsorbed to copper fine particles and volume resistivity, which is obtained by plotting the results of Examples 1 to 3 and Comparative Examples 1 to 3.

The values of the chlorine content relative to copper, the adsorbed amount of the water-soluble polymer, and the volume resistivity measured in Examples 1 to 5 and Comparative Examples 1 to 4 are shown in the following Table 1. FIG. 2 is a graph showing the relationship between the adsorbed amount of the water-soluble polymer and the volume resistivity, which is obtained by plotting the results of Examples 1 to 3 and Comparative Examples 1 to 3. It is to be noted that in FIG. 2, "E1", "E2", and "E3" represent Examples 1, 2, and 3, respectively and "CE1", "CE2", and "CE3" represent Comparative Examples 1, 2, and 3, respectively.

TABLE 1

|  | Cl/Cu (ppm by mass) | Water-soluble polymer content (% by mass) | Volume resistivity (μΩ·cm) |
| --- | --- | --- | --- |
| Example 1 | 11 | 1.2 | 70 |
| Example 2 | 7 | 0.9 | 81 |
| Example 3 | 7 | 0.8 | 67 |
| Example 4 | 4 | 0.7 | 68 |
| Example 5 | 12 | 1.1 | 72 |
| Comparative Example 1 | 76 | 1.2 | 117 |
| Comparative Example 2 | 64 | 1.0 | 91 |
| Comparative Example 3 | 29 | 1.2 | 76 |
| Comparative Example 4 | 54 | 3.8 | 2000 |

As can be seen from the results, the copper fine particles according to the present invention obtained in Examples 1 to 5 have a chlorine content as low as less than 20 ppm by mass relative to copper contained therein, and are therefore suitable as a material for electronic parts, and the copper conductive films obtained by sintering the copper fine particle dispersions obtained in Examples 1 to 5 at 220° C. for 1 hour in an atmosphere of nitrogen have a volume resistivity as low as less than 100 μΩ·cm. However, the copper fine particles obtained in Example 4 are slightly inferior in dispersion stability to the copper fine particles obtained in Example 1 because the copper fine particles obtained in Example 4 are not coated with PEI and therefore steric hindrance necessary for improving dispersibility cannot be sufficiently provided. On the other hand, in the cases of Comparative Examples 1 to 4, since the total chlorine content in the raw materials is 20 ppm by mass or more, the obtained copper fine particles have a chlorine content of 20 ppm by mass or more relative to copper, and are therefore not suitable as a material for electronic parts.

Further, the copper conductive film obtained in Example 1 is different in volume resistivity from the copper conductive films obtained in Comparative Examples 1 and 3 in spite of the fact that their water-soluble polymer contents are substantially the same. Referring to the chlorine contents measured in Example 1 and Comparative Examples 1 and 3, it is clear that when the chlorine content is lower, the volume resistivity is also lower. Further, as can be seen from FIG. 2, when the water-soluble polymer content is lower, the volume resistivity is also lower. Further, since the halogen content and the water-soluble polymer content measured in Comparative Example 4 exceed their upper limits specified in the present invention, the volume resistivity of the copper conductive film obtained by sintering the copper fine particle dispersion of Comparative Example 4 at 220° C. for 1 hour is significantly high.

From the results, it can be considered that the low-temperature sinterability of the copper fine particles according to the present invention results from their reduced amount of the water-soluble polymer adsorbed thereto and reduced halogen content. Further, when the water-soluble polymer content and the halogen content are lower, lower volume resistivity can be achieved.

The invention claimed is:

1. A method for producing copper fine particles which can be sintered at low temperatures and which have an average particle size of 50nm or less, by heating and reducing an oxide, hydroxide, or salt of copper included in a solution of ethylene glycol, diethylene glycol, or triethylene glycol, the method comprising:

bringing a water-soluble polymer into contact with an anion exchange resin to remove halogen from the water-soluble polymer, adding the water-soluble polymer as a dispersant and a noble metal compound containing no halogen or noble metal colloid containing no halogen for nucleation to the solution, and controlling a total halogen content of the solution including the water-soluble polymer and the noble metal compound or noble metal colloid to be less than 20 ppm by mass relative to copper.

2. The method for producing copper fine particles according to claim 1, wherein the water-soluble polymer is polyethyleneimine, and a weight ratio of an amount of the polyethyleneimine added to an amount of copper is in a range of 0.005 to 0.1.

3. Copper fine particles obtained by the method according to claim 2, which are coated with the water-soluble polymer, contain a noble metal, and have a halogen content of less than 20 ppm by mass relative to copper and an average particle size of 50 nm or less.

4. A copper fine particle dispersion obtained by performing solvent replacement with a polar solvent and concentration on a solution containing copper fine particles obtained by the method according to claim 2, which shows a volume resistivity of less than 100 μΩ·cm when applied onto a substrate and then sintered at 220° C. for 1 hour in an atmosphere of nitrogen.

5. The method for producing copper fine particles according to claim 1, wherein the water-soluble polymer is a mixture of polyethyleneimine and at least one of polyvinylpyrrolidone and polyallylamine, and a weight ratio of a total amount of the polyvinylpyrrolidone and polyallylamine added to an amount of copper is in a range of 0.01 to 0.8.

6. Copper fine particles obtained by the method according to claim 5, which are coated with the water-soluble polymer, contain a noble metal, and have a halogen content of less than 20 ppm by mass relative to copper and an average particle size of 50 nm or less.

7. A copper fine particle dispersion obtained by performing solvent replacement with a polar solvent and concentration on a solution containing copper fine particles obtained by the method according to claim 5, which shows a volume resistivity of less than 100 μΩ·cm when applied onto a substrate and then sintered at 220° C. for 1 hour in an atmosphere of nitrogen.

8. The method for producing copper fine particles according to claim 1, wherein a mass ratio of a noble metal contained in the noble metal compound or noble metal colloid to copper is in a range of 0.0004 to 0.01.

9. Copper fine particles obtained by the method according to claim 8, which are coated with the water-soluble polymer, contain a noble metal, and have a halogen content of less than 20 ppm by mass relative to copper and an average particle size of 50 nm or less.

10. A copper fine particle dispersion obtained by performing solvent replacement with a polar solvent and concentration on a solution containing copper fine particles obtained by the method according to claim 8, which shows a volume resistivity of less than 100 μΩ·cm when applied onto a substrate and then sintered at 220° C. for 1 hour in an atmosphere of nitrogen.

11. A method for producing copper fine particles comprising adding hydroxycarboxylic acid or a hydroxycarboxylic acid solution to a solution containing copper fine particles obtained by the method according to claim 1 to replace part of the water-soluble polymer adsorbed to the copper fine particles with hydroxycarboxylic acid so that an amount of the water-soluble polymer adsorbed to the copper fine particles becomes less than 1.5% by mass.

12. Copper fine particles obtained by the method according to claim 11, which are coated with the water-soluble polymer and hydroxycarboxylic acid, contain a noble metal, and have a halogen content of less than 20 ppm by mass relative to copper and an average particle size of 50 nm or less, wherein an amount of the water-soluble polymer adsorbed to copper is less than 1.5% by mass.

13. A copper fine particle dispersion obtained by performing solvent replacement with a polar solvent and concentration on a solution containing copper fine particles obtained by the method according to claim 11, which shows a volume resistivity of less than 100 μΩ·cm when applied onto a substrate and then sintered at 220° C. for 1 hour in an atmosphere of nitrogen.

14. Copper fine particles obtained by the method according to claim 1, which are coated with the water-soluble polymer, contain a noble metal, and have a halogen content of less than 20 ppm by mass relative to copper and an average particle size of 50 nm or less.

15. A copper fine particle dispersion obtained by performing solvent replacement with a polar solvent and concentration on a solution containing copper fine particles obtained by the method according to claim 1, which shows a volume resistivity of less than 100 μΩ·cm when applied onto a substrate and then sintered at 220° C. for 1 hour in an atmosphere of nitrogen.

\* \* \* \* \*

UNITED STATES PATENT AND TRADEMARK OFFICE
CERTIFICATE OF CORRECTION

PATENT NO. : 8,535,573 B2 Page 1 of 1
APPLICATION NO. : 12/734489
DATED : September 17, 2013
INVENTOR(S) : Ryoshi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 407 days.

Signed and Sealed this
Fifteenth Day of September, 2015

Michelle K. Lee
*Director of the United States Patent and Trademark Office*